(12) United States Patent
Kado

(10) Patent No.: US 9,018,860 B2
(45) Date of Patent: Apr. 28, 2015

(54) LED LIGHTING DEVICE

(71) Applicant: Panasonic Corporation, Osaka (JP)

(72) Inventor: Yoshikazu Kado, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/021,003

(22) Filed: Sep. 9, 2013

(65) Prior Publication Data

US 2014/0070713 A1 Mar. 13, 2014

(30) Foreign Application Priority Data

Sep. 12, 2012 (JP) .................. 2012-200872

(51) Int. Cl.
| | | |
|---|---|---|
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |
| H05B 33/08 | (2006.01) |
| H02M 3/158 | (2006.01) |
| H02M 1/00 | (2006.01) |

(52) U.S. Cl.
CPC ............ H05B 33/089 (2013.01); H02M 3/158 (2013.01); *H02M 2001/0009* (2013.01)

(58) Field of Classification Search
None
See application file for complete search history.

(56) References Cited

U.S. PATENT DOCUMENTS 7,276,861 B1 * 10/2007 Shteynberg et al. .......... 315/291

FOREIGN PATENT DOCUMENTS

| JP | 2005-142137 A | 6/2005 |
| JP | 2006-210271 A | 8/2006 |
| JP | 2007-005259 A | 1/2007 |
| JP | 2011-029194 A | 2/2011 |
| JP | 2012-014879 A | 1/2012 |
| JP | 2012-147507 A | 8/2012 |

* cited by examiner

*Primary Examiner* — Douglas W Owens
*Assistant Examiner* — Dedei K Hammond
(74) *Attorney, Agent, or Firm* — Renner, Otto, Boisselle & Sklar, LLP

(57) ABSTRACT

The LED lighting device of the present invention includes: a power supply circuit connected between a light source including a light emitting diode and a power source and including a series circuit of a switching device and an inductor; an inductor current detector configured to provide a measurement value indicative of an inductor current flowing through the inductor; a drive circuit configured to turn on the switching device at a predetermined period and turn off the switching device when the measurement value is equal to a first threshold or more; a load current detector configured to measure a load current flowing through the light source; and a protection device configured to, when the load current measured is equal to a second threshold or more, perform a protection operation of changing, to reduce the load current, a circuit constant of a power supply path in which the load current flows.

12 Claims, 8 Drawing Sheets

(a)

(b)

LED LIGHTING DEVICE

TECHNICAL FIELD

The present invention relates to LED lighting devices.

BACKGROUND ART

In the past, there have been proposed LED lighting devices designed to convert an AC voltage supplied from an AC power source to a DC voltage and apply the resultant DC voltage to a light source constituted by light emitting diodes (LEDs) to light up the light source (see e.g., JP 2012-147507 A).

FIG. 8 shows a diagram illustrating a circuit configuration of a prior LED lighting device. This prior LED lighting device has main components including a rectification circuit 1, a smoothing circuit 2, a step-down chopper circuit 3, a drive circuit 4, a switching current detector 5, and a load current detector 6. The LED lighting device uses an AC power source E1 as its input power source, and performs feedback control of a load current which flows through a light source 8 constituted by a plurality ofity of light emitting diodes, so as to light up the light source 8 at a desired lighting level. The following explanation is made to a configuration of the prior LED lighting device.

The rectification circuit 1 is a diode bridge constituted by a plurality of diodes not shown, and is connected between output terminals of the AC voltage source E1. Further, the rectification circuit 1 performs full-wave rectification or half-wave rectification on an AC voltage Vac inputted from the AC voltage source E1 and provides a resultant voltage to the smoothing circuit 2 connected to an output side of the rectification circuit 1.

The smoothing circuit 2 is constituted by a smoothing capacitor C21, and is connected between output terminals of the rectification circuit 1. The smoothing circuit 2 generates a DC voltage Vdc by smoothing a rectified voltage supplied from the rectification circuit 1 and provides the generated DC voltage Vdc to the step-down chopper circuit 3 connected to the output side of the smoothing circuit 2.

The step-down chopper circuit 3 is constituted by a switching device Q31, an inductor L31, a capacitor C31, and a diode D31. Connected in parallel with the capacitor C21 is a series circuit of the switching device Q31, a resistor R51 constituting the switching current detector 5, the inductor L31, and the capacitor C31 for smoothing. Further, the diode D31 for current regeneration is connected in parallel with a series circuit of the inductor L31 and the capacitor C31. The switching device Q31 is turned on and off alternately by the drive circuit 4. Additionally, connected in parallel with the capacitor C31 is a series circuit of the light source 8 constituted by the plurality of light emitting diodes Ld81 connected in series with each other, and a resistor R61 constituting the load current detector 6.

When the drive circuit 4 turns on and off the switching device Q31 alternately, the step-down chopper circuit 3 with the above configuration lowers the DC voltage Vdc and applies the lowered DC voltage Vdc across the light source 8. Consequently, the load current (hereinafter, referred to as an LED current Ild) which is a DC current flows through the light source 8, and each of the light emitting diodes Ld81 constituting the light source 8 lights up.

The switching current detector 5 is constituted by the resistor R51 connected in series with the switching device Q31. The switching current detector 5 measures a current flowing through the switching device Q31 (hereinafter referred to as "switching current Isw"). The switching current detector 5 provides a magnitude of a voltage across the resistor R51 as a detection value indicative of the switching current Isw to the drive circuit 4.

The load current detector 6 is constituted by the resistor R61 connected in series with the light source 8. The load current detector 6 measures the LED current Ild flowing through the light source 8. The load current detector 6 provides a magnitude of a voltage across the resistor R61 as a detection value indicative of the LED current Ild to the drive circuit 4.

The drive circuit 4 turns on and off the switching device Q31 based on the detection values provided from the switching current detector 5 and the load current detector 6 such that the LED current Ild is equal to a predetermined desired value. How to turn on and off the switching device Q31 by the drive circuit 4 is described with reference to FIG. 9 (a).

The drive circuit 4 performs on/off control of turning on the switching device Q31 at a predetermined period T1 and turning off the switching device Q31 when the detection value of the switching current detector 5 becomes not less than a turning-off threshold Th. This turning-off threshold Th is selected based on the detection value of the load current detector 6. Note that, a state in which the LED current Ild is equal to the predetermined desired value is defined as a normal state. In FIG. 9 (a), the turning-off threshold Th is Th1. To adjust the obtained detection value (LED current Ild) of the load current detector 6 to the desired value, the drive circuit 4 performs feedback control by adjusting a turned-on period Ton by means of varying the turning-off threshold Th based on the detection value of the load current detector 6. Note that, the turned-on period Ton in the normal state is represented by Ton1, and the turned-off period Toff in the normal state is represented by Toff1. For example, with regard to the IPD (trade name "MIP9E0X") available from Panasonic Corporation, the drive circuit 4 and the switching device Q31 are provided in the same package. This IPD performs the aforementioned on/off control on the switching device Q31 to keep constant a voltage of a terminal receiving the detection value of the load current detector 6.

The aforementioned prior LED lighting device is likely to be in an abnormal state in which the drive circuit 4 fails to obtain the detection value from the load current detector 6 due to short circuiting and/or an open fault of electronic parts and/or the drive circuit 4 and fails to perform the feedback control. For example, with regard to the drive circuit 4, when a terminal which receives the detection value from the load current detector 6 is grounded, the drive circuit 4 determines that the LED current Ild is insufficient. Hence, the drive circuit 4 increases the turning-off threshold Th to Th2 (>Th1) defining the upper limit. Also in a case where the drive circuit 4 is constituted by the IPD available from Panasonic Corporation, when a terminal which receives the detection value from the load current detector 6 is grounded, the IPD determines that the LED current Ild is insufficient. Additionally, also when a terminal which transfers the detection value from the load current detector 6 to a control circuit of an inside MOSFET is directly connected to a surrounding part having a reference potential and is short-circuited, the IPD determines that the LED current Ild is insufficient.

When such an abnormal state occurs, as shown in FIG. 9 (b), the turning-off threshold Th is increased up to Th2 defining the upper limit. Hence, since the time necessary for the detection value of the switching current detector 5 to reach the turning-off threshold Th2 is increased, the turned-on period of the switching device Q31 is equal to Ton3 (>Ton1) which is longer than that in the normal state. Such an increase in the turned-on period of the switching device Q31 causes an increase in the LED current Ild.

As shown in FIG. 10, when the LED current Ild in the normal state is Ild1, the LED current Ild in the abnormality is Ild4 greater than Ild2 defining the rated upper limit. The rated upper limit Ild2 is decided in consideration of thermal stress on lighting fixtures or surrounding parts due to heat generated in the light source 8. When the LED current Ild exceeds the rated upper limit Ild2, a flow of an excess current through the light source 8 is likely to cause heat in the light source 8 and such heat may cause thermal stress on the lighting fixtures and the surrounding parts. Consequently, safety may become insufficient.

Additionally, in the prior LED lighting device, when the abnormal state causing an increase in the LED current Ild occurs, power supply to the light source 8 is terminated by means of opening a power supply path by melting a fuse. However, when the power supply path is opened, the light source 8 fails to light up. Therefore, this is inconvenient for a user.

Further, a device for sensing the heat of the driver circuit 4 may be provided. In this case, while the temperature of the drive circuit 4 exceeds a predetermined temperature, the switching device Q31 may be kept turned off. According to this method, it is possible to suppress the excess current supplied to the light source 8. However, since an LED lighting fixture for holding the LED lighting device has higher heat dissipation than that of a discharge lamp lighting device, the LED lighting fixture becomes in temperature equilibrium before the temperature of the drive circuit 4 reaches the predetermined temperature. Consequently, it may be impossible to suppress the excess current flowing through the light source 8. Moreover, since the control of the drive circuit 4 become complex, the production cost may be increased.

SUMMARY OF INVENTION

In view of the above insufficiency, the present invention has aimed to propose an LED lighting device which is capable of reducing a load current without modifying control of the drive circuit, in response to abnormality that is likely to cause an increase in the load current.

The LED lighting device of the first aspect in accordance with the present invention includes: a power supply circuit which is connected between a light source including a light emitting diode and a power source and includes a series circuit of a switching device and an inductor; an inductor current detector configured to measure an inductor current flowing through the inductor and provide a measurement value indicative of the inductor current; a drive circuit configured to allow the power supply circuit to provide a predetermined DC current to the light source by turning on the switching device at a predetermined period and turning off the switching device when the measurement value from the inductor current detector is equal to a first threshold or more; a load current detector configured to measure a load current flowing through the light source; and a protection device configured to, when the load current measured by the load current detector is equal to a second threshold or more, perform a protection operation of changing, to reduce the load current, a circuit constant of a power supply path in which the load current flows.

With regard to the LED lighting device of the second aspect in accordance with the present invention, in addition to the first aspect, the protection device is configured to, in the protection operation, change the circuit constant to shorten a turning-on period of the switching device.

With regard to the LED lighting device of the third aspect in accordance with the present invention, in addition to the first or second aspect, the protection device is configured to, in the protection operation, increase a current increase rate at the inductor.

With regard to the LED lighting device of the fourth aspect in accordance with the present invention, in addition to the third aspect, the circuit constant is defined as an inductance of the inductor. The protection device is configured to, in the protection operation, increase the current increase rate by reducing the inductance of the inductor.

With regard to the LED lighting device of the fifth aspect in accordance with the present invention, in addition to the fourth aspect, the inductor is constituted by a series circuit of a first winding and a second winding. The protection device includes a bypassing switching device connected in parallel with the second winding. The protection device is configured to, in the protection operation, reduce the inductance of the inductor by turning on the bypassing switching device.

With regard to the LED lighting device of the sixth aspect in accordance with the present invention, in addition to the fifth aspect, the protection device includes a latch circuit configured to keep turning on the bypassing switching device.

With regard to the LED lighting device of the seventh aspect in accordance with the present invention, in addition to the first or second aspect, the inductor current detector includes a resistance circuit connected in series with the series circuit. The measurement value indicates a value corresponding to a voltage across the resistance circuit. The circuit constant is defined as a resistance of the resistance circuit. The protection device is configured to, in the protection operation, increase the resistance.

With regard to the LED lighting device of the eighth aspect in accordance with the present invention, in addition to the seventh aspect, the resistance circuit is constituted by a series circuit of a first resistor and a second resistor. The protection device includes a bypassing switching device connected in parallel with the second resistor. The protection device is configured to, in the protection operation, increase the resistance of the resistance circuit by turning off the bypassing switching device.

With regard to the LED lighting device of the ninth aspect in accordance with the present invention, in addition to the third aspect, the circuit constant is defined as an inductor voltage applied across the inductor. The protection device is configured to, in the protection operation, increase the current increase rate by increasing the inductor voltage.

With regard to the LED lighting device of the tenth aspect in accordance with the present invention, in addition to the ninth aspect, the protection device is configured to, in the protection operation, increase the inductor voltage by increasing an input voltage inputted into the power supply circuit from the power source.

With regard to the LED lighting device of the eleventh aspect in accordance with the present invention, in addition to the tenth aspect, the LED lighting device further comprises a circuit which is interposed between the power source and the power supply circuit and is configured to generate the input voltage from a voltage supplied from the power source. The protection device is configured to, in the protection operation, control the circuit to increase the input voltage.

With regard to the LED lighting device of the twelfth aspect in accordance with the present invention, in addition to the ninth aspect, the protection device is configured to, in the protection operation, increase the inductor voltage by decreasing a forward voltage of the light source.

With regard to the LED lighting device of the thirteenth aspect in accordance with the present invention, in addition to the twelfth aspect, the light source is constituted by a series circuit of a first light emitting diode and a second light emitting diode. The protection device includes a bypassing switching device connected in parallel with the second light emitting diode. The protection device is configured to, in the protection operation, decrease the forward voltage of the light source by turning on the bypassing switching device.

DESCRIPTION OF EMBODIMENTS

First Embodiment

Figure 1:
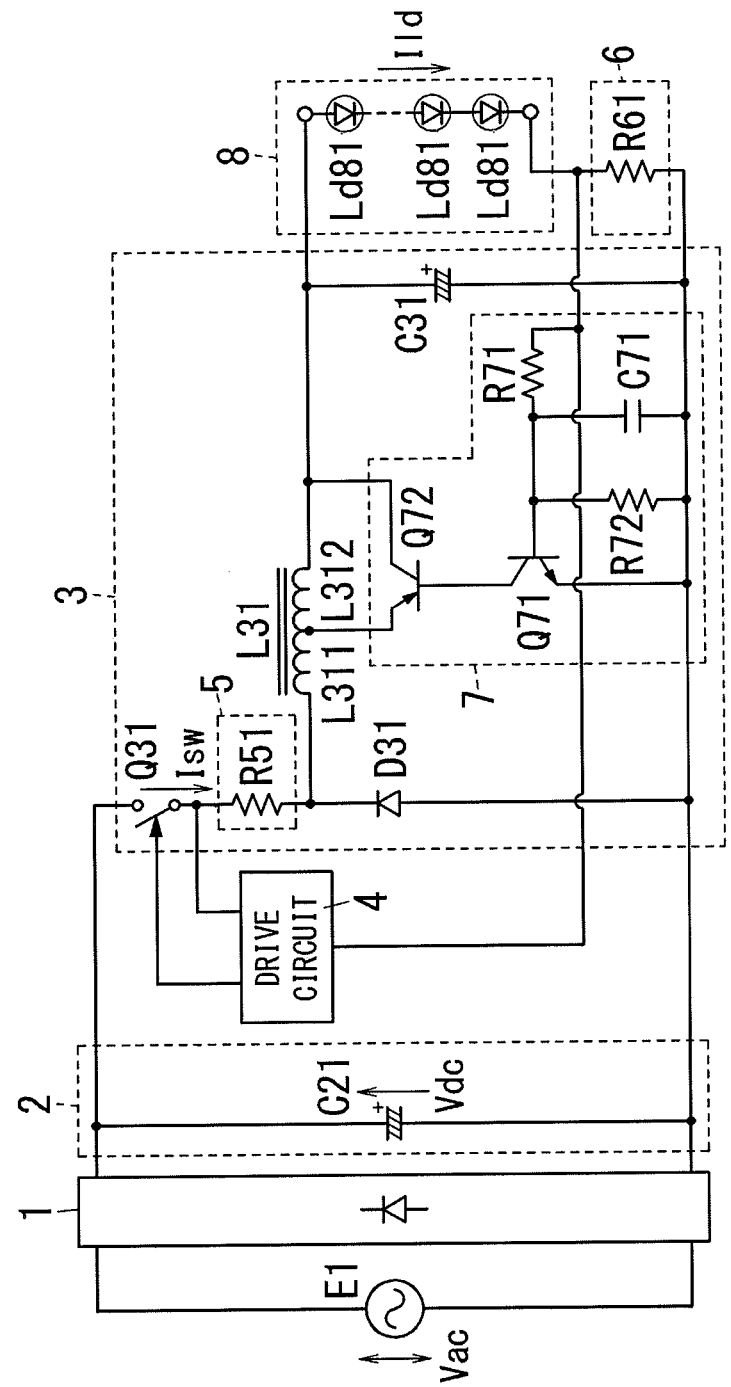
FIG. 1 is a diagram illustrating a circuit configuration of the LED lighting device of the first embodiment in accordance with the present invention.

FIG. 1 shows a diagram illustrating a circuit configuration of the LED lighting device of the present embodiment. The LED lighting device of the present embodiment has main components including a rectification circuit 1, a smoothing circuit 2, a step-down chopper circuit (power supply circuit) 3, a drive circuit 4, a switching current detector 5, a load current detector 6, and an output current protection circuit 7. The LED lighting device uses an AC power source E1 as its input power source (power source), and performs feedback control of a load current flowing through a light source 8 constituted by a plurality of light emitting diodes Ld81 (light emitting elements) so as to light up the light source 8 at a desired lighting level. The following explanation is made to a configuration of the LED lighting device of the present embodiment.

The rectification circuit 1 is a diode bridge constituted by a plurality of diodes not shown, and is connected between output terminals of the AC voltage source E1. Further, the rectification circuit 1 performs full-wave rectification or half-wave rectification on an AC voltage Vac inputted from the AC voltage source E1 and provides a resultant voltage to the smoothing circuit 2 connected to the output side of the rectification circuit 1.

The smoothing circuit 2 is constituted by a smoothing capacitor C21, and is connected between output terminals of the rectification circuit 1. The smoothing circuit 2 generates a DC voltage Vdc by smoothing a rectified voltage supplied from the rectification circuit 1 and provides the generated DC voltage Vdc to the step-down chopper circuit 3 connected to the output side of the smoothing circuit 2.

The step-down chopper circuit 3 (power supply circuit) is constituted by a switching device Q31, an inductor L31, a capacitor C31, and a diode D31. Connected in parallel with the capacitor C21 is a series circuit of the switching device Q31, a resistor R51 constituting the switching current detector 5, the inductor L31, and the capacitor C31 for smoothing. Further, the diode D31 for current regeneration is connected in parallel with a series circuit of the inductor L31 and the capacitor C31. The switching device Q31 is turned on and off by the drive circuit 4. Additionally, connected in parallel with the capacitor C31 is a series circuit of the light source 8 constituted by the plurality of light emitting diodes Ld81 (light emitting elements) connected in series with each other, and a resistor R61 constituting the load current detector 6.

As mentioned above, the step-down chopper circuit (power supply circuit) 3 includes a series circuit of the switching device Q31 and the inductor L31. The series circuit of the switching device Q31 and the inductor L31 is connected between the light source 8 including the light emitting diode Ld81 and the power source (AC power source) E1.

When the drive circuit 4 turns on and off the switching device Q31, the step-down chopper circuit 3 with the above configuration lowers the DC voltage Vdc and applies the lowered DC voltage Vdc across the light source 8. Consequently, the load current (hereinafter, referred to as an LED current Ild) which is a DC current flows through the light source 8, and each of the light emitting diodes Ld81 constituting the light source 8 lights up. Note that, in the present embodiment, the light source 8 is constituted by the plurality of light emitting diodes Ld81 but may be constituted by a single light emitting diode Ld81.

The switching current detector 5 is constituted by the resistor R51 connected in series with the switching device Q31. The switching current detector 5 measures a current flowing through the switching device Q31 (hereinafter referred to as "switching current Isw"). The switching current detector 5 provides a magnitude of a voltage across the resistor R51 as a detection value indicative of the switching current Isw to the drive circuit 4. Note that, the switching device Q31, the resistor R51, and the inductor L31 are connected in series with each other. The switching current Isw which flows when the switching device Q31 is turned on is equal to a current (inductor current) flowing through the inductor L31. In brief, the switching current detector 5 serves as an inductor current detector configured to measure the inductor current which flows when the switching device Q31 is turned on.

In summary, the switching current detector (inductor current detector) 5 is configured to measure the inductor current (switching current Isw) flowing through the inductor L31 and provide a measurement value indicative of the inductor current.

The load current detector 6 is constituted by the resistor R61 connected in series with the light source 8. The load current detector 6 measures the LED current Ild flowing through the light source 8. The load current detector 6 provides a magnitude of a voltage across the resistor R61 as a detection value indicative of the LED current Ild to the drive circuit 4. As mentioned above, the load current detector 6 is configured to measure the load current (LED current Ild) flowing through the light source 8.

The drive circuit 4 is configured to allow the power supply circuit 3 to provide a predetermined DC current to the light source 8 by turning on the switching device Q31 at a predetermined period and turning off the switching device Q31 when the measurement value from the inductor current detector 5 is equal to a first threshold or more.

More specifically, the drive circuit 4 turns on and off the switching device Q31 based on the detection values provided from the switching current detector 5 and the load current detector 6 such that the LED current Ild is equal to a predetermined desired value. How to turn on and off the switching device Q31 by the drive circuit 4 is described with reference to FIG. 2 (b).

Figure 2:
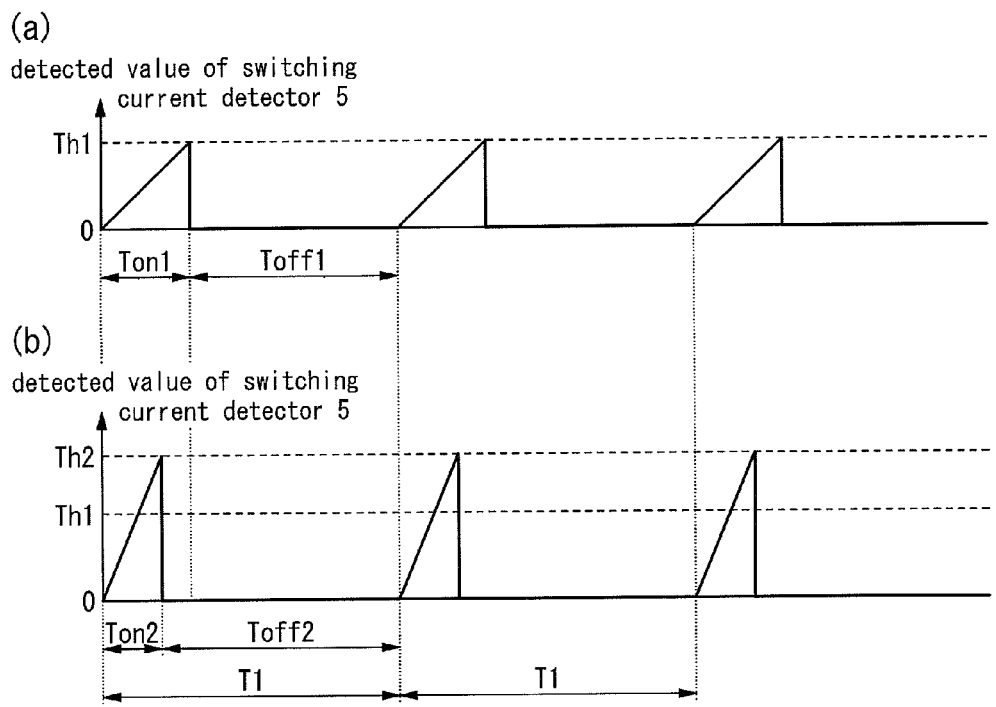
FIG. 2 is a waveform chart illustrating the detection value of the switching current detector of the above.

The drive circuit 4 performs on/off control of turning on the switching device Q31 at the predetermined period T1 and turning off the switching device Q31 when the detection value (detection result) of the switching current detector 5 becomes not less than the turning-off threshold Th (first threshold). This turning-off threshold Th is selected based on the detection value of the load current detector 6. The turning-off threshold Th is selected such that the turning-off threshold Th is increased with a decrease in the detection value (LED current Ild) of the load current detector 6. However, an upper limit for the turning-off threshold Th is Th2. Note that, a state in which the LED current Ild is equal to a desired value lower than a rated upper limit Ild2 is defined as a normal state. In FIG. 2 (a), the turning-off threshold Th is Th1.

An increase in the turning-off threshold Th causes an increase in time which is necessary for the detection value of the switching current detector 5 to reach the turning-off threshold Th, that is, a turned-on period of the switching device Q31 is prolonged (a turned-off period of the switching device Q31 is shortened). As a result, the LED current Ild flowing through the light source 8 is increased. Note that, the waveform chart shown in FIG. 2 (a) relates to the normal state of the LED current Ild. In this regard, the turned-on period Ton of the switching device Q31 under this normal state is represented by Ton1, and the turned-off period Toff of the switching device Q31 under this normal state is represented by Toff1.

To adjust the obtained detection value (LED current Ild) of the load current detector 6 to the desired value, the drive circuit 4 performs feedback control by adjusting the turned-on period Ton by means of varying the turning-off threshold Th based on the detection value of the load current detector 6. For example, with regard to the IPD (trade name "MIP9E0X") available from Panasonic corporation, the drive circuit 4 and the switching device Q31 are provided in the same package, and the switching device Q31 is turned on and off in the aforementioned manner such that a voltage of a terminal (V01 pin) receiving the detection value of the load current detector 6 is kept constant.

The following explanation is made to an abnormal state in which the drive circuit 4 fails to obtain the detection value from the load current detector 6 due to short circuiting and/or an open fault of electronic parts and/or the drive circuit 4 and fails to perform the feedback control.

For example, with regard to the drive circuit 4, when a terminal which receives the detection value from the load current detector 6 is grounded, the drive circuit 4 determines that the LED current Ild is insufficient. Hence, the drive circuit 4 increases the turning-off threshold Th to Th2 (>Th1) defining the upper limit.

As described above, according to the prior LED lighting device, the turned-on period Ton of the switching device Q31 is increased with an increase in the turning-off threshold Th, and thus the LED current Rd is increased. In this case, the LED current Ild is likely to exceed the rated upper limit Ild2.

However, with employing the output current protection circuit 7 which reduces the LED current Ild in response to the abnormality, the LED lighting device of the present embodiment can suppress supply of an excess current to the light source 8 even if abnormality that disables the feedback control occurs. In view of the above insufficiency, the present invention has aimed to propose an LED lighting device which is capable of reducing a load current without modifying control of the drive circuit, in response to abnormality that is likely to cause an increase in the load current. The following explanation is made to the output current protection circuit 7.

The output current protection circuit (protection device) 7 is configured to, when the load current measured by the load current detector 6 is equal to a second threshold or more, perform a protection operation of changing, to reduce the load current, a circuit constant (circuit property) of a power supply path in which the load current flows. The power supply path is, for example, defined as a path including the switching device Q31, the resistor R51, the inductor L31, and the light source 8.

The protection device 7 is configured to, in the protection operation, change the circuit constant of the power supply path to shorten the turned-on period Ton of the switching device Q31. In the present embodiment, the protection device 7 is configured to, in the protection operation, increase a current increase rate at the inductor L31. Further in the present embodiment, the circuit constant of the power supply path is defined as the inductance of the inductor L31. The protection device 7 is configured to increase the current increase rate by reducing the inductance of the inductor L31.

The following is a detailed explanation made to the output current protection circuit 7. The output current protection circuit 7 (output current protection means) is constituted by switching devices Q71 and Q72, resistors R71 and R72, and a capacitor C71. Connected in parallel with the resistor R61 is a series circuit of the resistors R71 and R72. The capacitor C71 is connected in parallel with the resistor R72. The switching device Q71 is an NPN transistor, and has a base connected to a connection point of the resistors R71 and R72, an emitter connected to a negative terminal of the capacitor C21, and a collector connected to the switching device Q72.

Further, the inductor L31 of the present embodiment has an intermediate point, and is constituted by a first winding L311 and a second winding L312. In brief, the inductor L31 is constituted by a series circuit of the first winding L311 and the second winding L312. The switching device Q72 is an NPN transistor, and is connected in parallel with the second winding L312. In brief, the switching device Q72 serves as a bypassing switching device connected in parallel with the second winding L312.

For example, the switching device Q72 has an emitter connected to the intermediate point (one end of the second winding L312) of the inductor L31, a collector connected to another end of the second winding L312, and a base connected to the collector of the switching device Q71.

Accordingly, when the magnitude of the voltage across the resistor R61 corresponding to the detection value (detection result) of the load current detector 6 becomes equal to the predetermined abnormality judgment threshold (second threshold) or more, the switching device Q71 is turned on. When the switching device Q71 is turned on, the switching device Q72 is also turned on. In summary, the protection device 7 is configured to, in the protection operation, reduce the inductance of the inductor L31 by turning on the bypassing switching device Q72.

Besides, the abnormality judgment threshold (second threshold) for determining the time at which the switching device Q71 is turned on is selected to be greater than the detection value of the load current detector 6 obtained when the LED current Ild is in the normal state. In brief, while the LED current Ild is in the normal state, the switching device Q71 is kept turned off.

Next, with reference to FIG. 2 (b), the operation of the drive circuit 4 when the abnormality disabling the feedback control occurs is described.

When the abnormality disabling the feedback control occurs, the turning-off threshold Th is increased up to the upper limit Th2 and thus the LED current Ild is increased. At this time when the LED current Ild is increased and the detection value of the load current detector 6 becomes equal to the abnormality judgment threshold or more, the switching device Q71 and the switching device Q72 are turned on. Since the switching device Q72 is connected in parallel with the second winding L312, turning on the switching device Q72 causes a short circuit between the both ends of the second winding L312. When the short circuit between the both ends of the second winding L312 occurs, the inductance of the inductor L31 is decreased.

Figure 3:
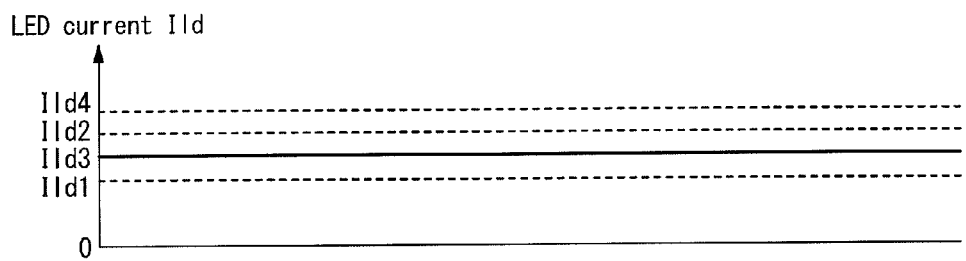
FIG. 3 is a waveform chart illustrating the LED current of the above.

In other words, when the LED current Ild is increased and the detection value of the load current detector 6 becomes not less than the abnormality judgment threshold, the output current protection circuit 7 decreases the inductance of the inductor L31. A decrease in the inductance of the inductor L31 causes an increase in an increasing slope of the inductor current (switching current Isw) in the turned-on period Ton of the switching device Q31. Consequently, the time necessary for the detection value of the switching current detector 5 to reach the turning-off threshold Th2 (i.e., the turned-on period Ton of the switching device Q31) is shortened relative to the prior art, and thus becomes Ton2 (<Ton3). When the turned-on period Ton is shortened, the LED current Ild becomes Ild3 lower than the abnormal value (Ild4) of the prior art. Therefore, it is possible to keep the LED current Ild lower than the rated upper limit Ild 2 (see FIG. 3).

As mentioned above, the LED lighting device of the present embodiment includes the following first feature. In the first feature, the LED lighting device includes the power supply circuit (step-down chopper circuit) 3, the inductor current detector (switching current detector) 5, the load current detector 6, the drive circuit 4, and the output current protection means (output current protection circuit) 7. The power supply circuit 3 includes the switching device Q31 and the inductor L31 connected in series with the switching device Q31. When the switching device Q31 is turned on and off, the power supply circuit 3 provides the DC power to the light source 8 constituted by one or more light emitting elements Ld81. The inductor current detector 5 measures the inductor current (switching current Isw) flowing through the inductor L31. The load current detector 6 measures the load current (LED current Ild) supplied to the light source 8. The drive circuit 4 turns on the switching device Q31 at the predetermined period, and turns off the switching device Q31 when the detection result of the inductor current detector 5 is equal to the first threshold or more. When the detection result of the load current detector 6 is equal to the second threshold or more, the output current protection means 7 varies the circuit constant regarding the power supply path to the light source 8 to reduce the load current (LED current Ild).

In other words, the LED lighting device includes the power supply circuit (step-down chopper circuit) 3, the inductor current detector (switching current detector) 5, the load current detector 6, the drive circuit 4, and the protection device (output current protection circuit) 7. The power supply circuit 3 is connected between the light source 8 including the light emitting diode Ld81 and the power source E1. The power supply circuit 3 includes the series circuit of the switching device Q31 and the inductor L31. The inductor current detector 5 is configured to measure the inductor current flowing through the inductor L31 and provide the measurement value indicative of the inductor current. The drive circuit 4 is configured to allow the power supply circuit 3 to provide the predetermined DC current to the light source 8 by turning on the switching device Q31 at the predetermined period and turning off the switching device Q31 when the measurement value from the inductor current detector 5 is equal to the first threshold or more. The load current detector 6 is configured to measure the load current (LED current Ild) flowing through the light source 8. The protection device (output current protection circuit) 7 is configured to, when the load current measured by the load current detector 6 is equal to the second threshold or more, perform the protection operation of changing, to reduce the load current, the circuit constant of the power supply path in which the load current flows.

Additionally, the LED lighting device of the present embodiment includes the following second to fifth features. Note that, the second to fifth features are optional features.

As for the second feature, in addition to the first feature, when the detection result of the load current detector 6 is equal to the second threshold or more, the output current protection means 7 varies the circuit constant regarding the power supply path to the light source 8 to shorten the turned-on period Ton of the switching device Q31.

In other words, the protection device 7 is configured to, in the protection operation, change the circuit constant to shorten the turned-on period Ton of the switching device Q31.

As for the third feature, in addition to the first or second feature, when the detection result of the load current detector 6 is equal to the second threshold or more, the output current protection means 7 increases the increasing slope of the inductor current at the time when the switching device Q31 is turned on.

In other words, the protection device 7 is configured to, in the protection operation, increase the current increase rate at the inductor L31.

As for the fourth feature, in addition to the third feature, when the detection result of the load current detector 6 is equal to the second threshold or more, the output current protection means 7 decreases the inductance of the inductor L31.

In other words, the circuit constant is defined as the inductance of the inductor L31. The protection device 7 is configured to, in the protection operation, increase the current increase rate by reducing the inductance of the inductor L31.

As for the fifth feature, in addition to the fourth feature, the inductor L31 is constituted by the series circuit of the first winding L311 and the second winding L312. The protection device 7 includes the bypassing switching device Q72 connected in parallel with the second winding L312. The protection device 7 is configured to, in the protection operation, reduce the inductance of the inductor L31 by turning on the bypassing switching device Q72.

As mentioned above, according to the present embodiment, when the abnormality which causes an increase in the LED current Ild occurs, the output current protection circuit 7 changes the circuit constant regarding the power supply path to the light source 8 (in the present embodiment, the output current protection circuit 7 reduces the inductance of the inductor L31), thereby reducing the LED current Ild. Consequently, even in the abnormality, the supply of the excess current to the light source 8 is suppressed. It is possible to reduce thermal stress on the lighting fixture holding the light source 8 and the parts surrounding the light source 8. Hence, resin molded article with a low melting point is available. Thus, it is possible to facilitate a molding process and to reduce a molding cost. Further, even if the abnormality which disables the feedback control occurs, the supply of the LED current Ild is continued and the light source 8 is kept turned on. Hence, the usability can be improved.

Further, the present embodiment changes not the control of turning on and off the switching device Q31 by the drive circuit 4 but the circuit constant. Hence, there is no need to provide a device for sensing the heat of the drive circuit 4. Thus, since the drive circuit 4 need not have a complex configuration, it is possible to use the drive circuit 4 with high versatility. Therefore, the production cost can be reduced.

As described above, the present embodiment is capable of reducing the load current without modifying control of the drive circuit 4, in response to the abnormality that is likely to cause an increase in the load current (LED current Ild).

Besides, the turned-on period Ton of the switching device Q31 in the abnormality can be adjusted by means of changing a turn ratio of the first winding L311 to the second winding L312. Hence, the LED current Ild3 in the abnormality can be selected in accordance with the allowable temperature of the lighting fixture to which the LED lighting device of the present embodiment is attached. Thus, a degree of the design margin of the LED lighting device can be improved.

In the present embodiment, the inductor L31 is provided with the intermediate point, and the first winding L311 and the second winding L312 connected in series with each other is used, and when the abnormality occurs, the short circuit between the both ends of the second winding L312 is made. According to this, the inductance of the inductor L31 can be reduced. However, the present embodiment is not limited to the aforementioned configuration. For example, inductors connected in parallel with each other can be used. In this example, a switching device is connected in series with one of the inductors. When the abnormality occurs, the switching device connected with the inductor is turned on to reduce the combined inductance of the inductors.

Second Embodiment

Figure 4:
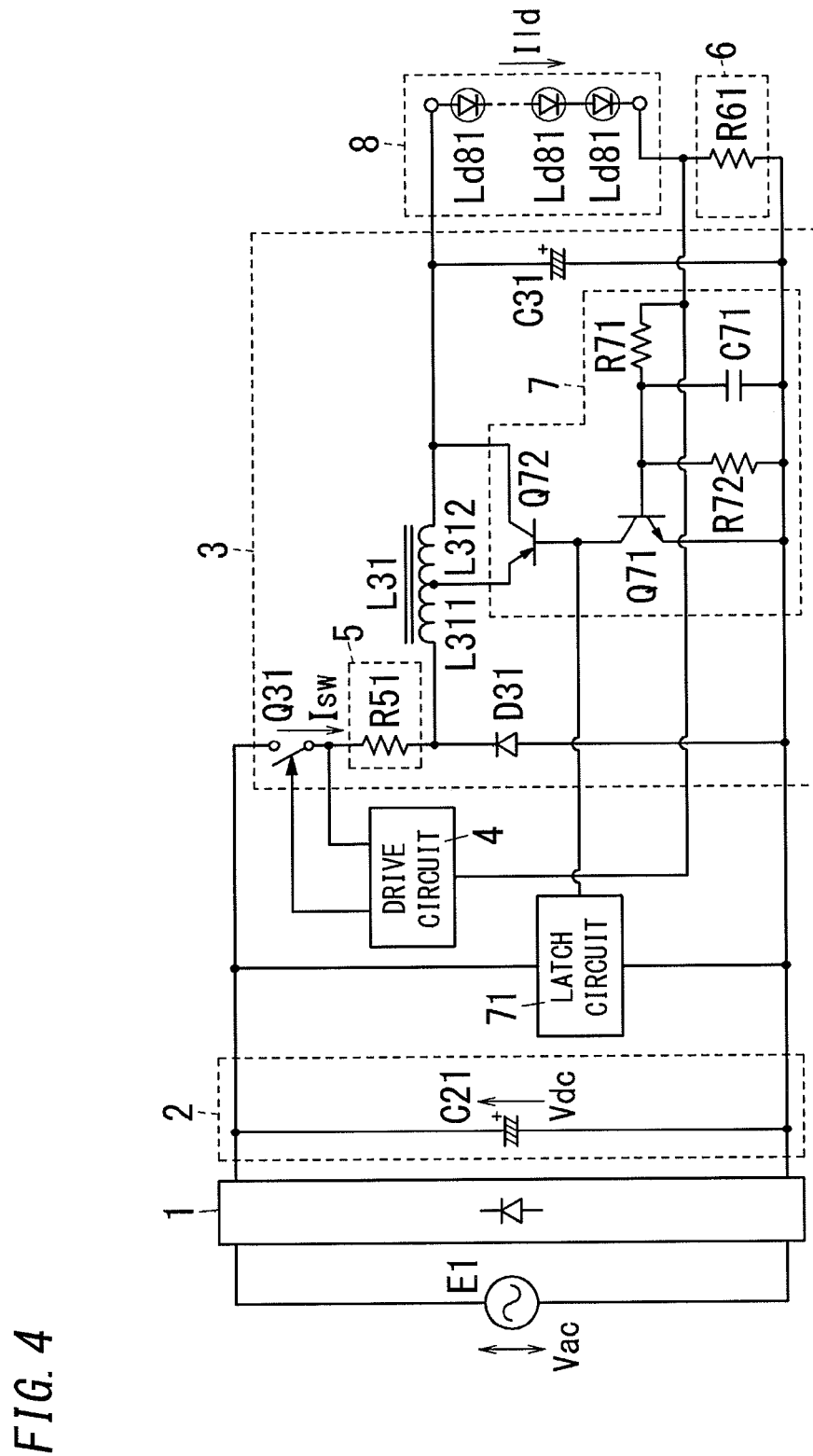
FIG. 4 is a diagram illustrating a circuit configuration of the LED lighting device of the second embodiment in accordance with the present invention.

FIG. 4 shows a diagram illustrating the circuit configuration of the LED lighting device of the present embodiment. The LED lighting device of the present embodiment is characterized by including a latch circuit 71 configured to keep a turned-off state of the switching device Q72, in addition to the components of the LED lighting device of the first embodiment. Note that, components common to the LED lighting devices of the present embodiment and the first embodiment are designated by the same reference numerals and explanations thereof are deemed unnecessary.

The latch circuit 71 measures the electric potential at the base of the switching device Q72 to judge whether the switching device Q72 is in the turned-on state or the turned-off state. Further, the latch circuit 71 is connected between the both ends of the capacitor C21 constituting the smoothing circuit 2. The latch circuit 71 measures the DC voltage Vdc to judge whether the AC voltage source E1 supplies power.

When acknowledging that the switching device Q72 is turned on while the AC voltage source E1 supplies power, the latch circuit 71 keeps making the short circuit between the base of the switching device Q72 and the ground (the negative terminal of the capacitor C21).

In other words, once the switching device Q72 is turned on when the detection value of the load current detector 6 becomes not less than the turning-off threshold Th2 while the light source 8 lights up, the latch circuit 71 keeps the switching device Q72 in the turned-on state irrespective of the magnitude of the subsequent LED current Ild. Consequently, even if the switching device Q71 is turned off again when the detection value (LED current Ild) of the load current detector 6 is varied and falls below the abnormality judgment threshold, the switching device Q72 is kept in the turned-off state. Therefore, a state in which the LED current Ild is reduced continues.

The LED lighting device of the present embodiment includes the following sixth feature in addition to the aforementioned first to fifth features. As for the sixth feature, in addition to the fifth feature, the protection device 7 includes the latch circuit 71 configured to keep turning on the bypassing switching device Q72.

Hence, according to the present embodiment, with continuously suppressing the excess current flowing through the light source 8, heat generation at the light source 8 can be suppressed. Consequently, safety can be enhanced.

Third Embodiment

Figure 5:
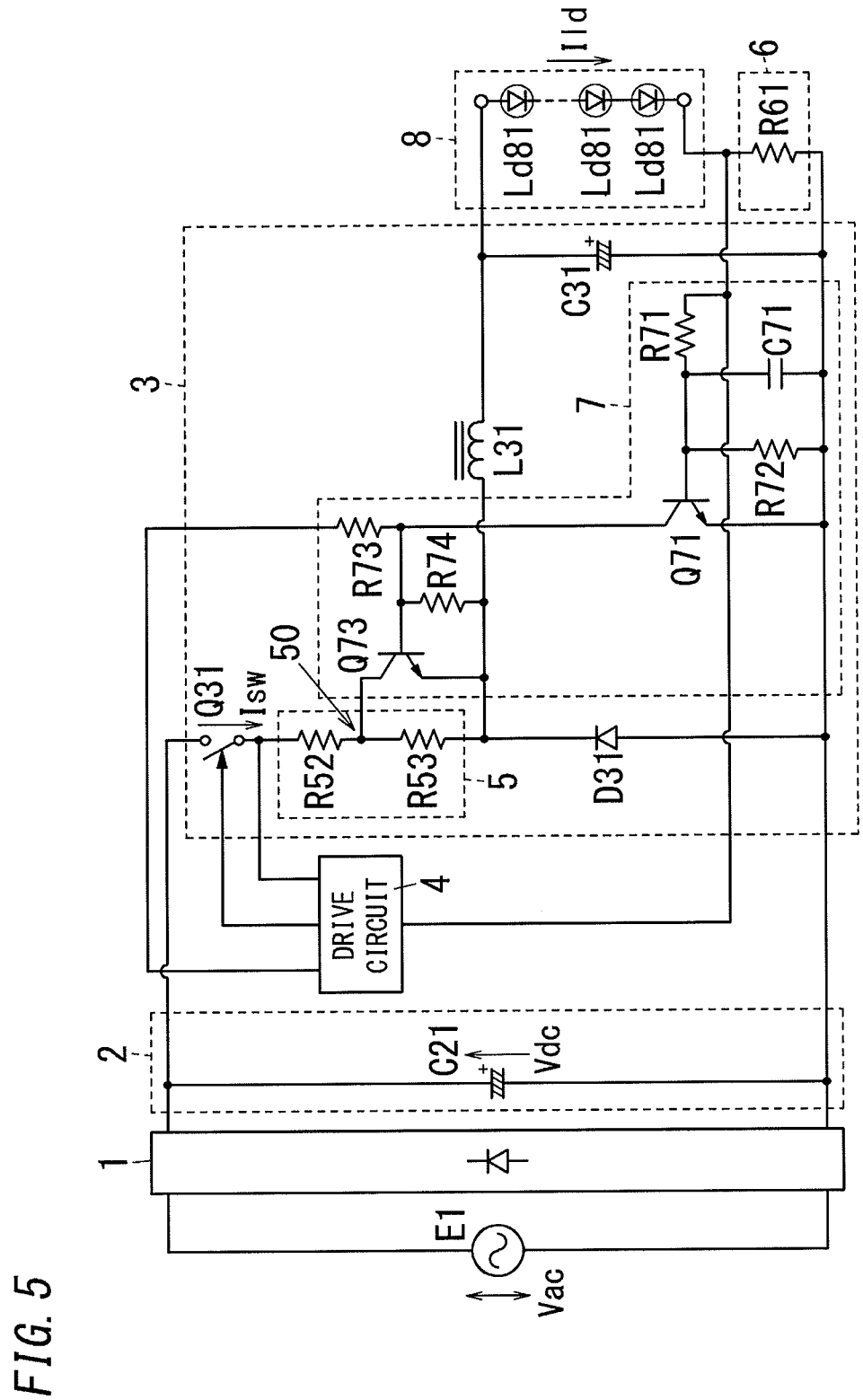
FIG. 5 is a diagram illustrating a circuit configuration of the LED lighting device of the third embodiment in accordance with the present invention.

FIG. 5 shows a diagram illustrating the circuit configuration of the LED lighting device of the present embodiment. The LED lighting device of the present embodiment is characterized in that the switching current detector 5 is constituted by a series circuit (resistance circuit) 50 of resistors R52 and R53 and that the output current protection circuit 7 is designed to close and open a circuit between opposite ends of the resistor R53 based on the detection value from the load current detector 6. Note that, components common to the LED lighting devices of the present embodiment and the first embodiment are designated by the same reference numerals and explanations thereof are deemed unnecessary.

The switching current detector 5 of the present embodiment is constituted by the series circuit 50 of the resistors R52 and R53. The switching current detector 5 provides a magnitude of a voltage across the series circuit 50 of the resistors R52 and R53 as the detection value indicative of the switching current Isw to the drive circuit 4.

In other words, the inductor current detector 5 includes the resistance circuit 50 connected in series with the series circuit (the series circuit of the switching device Q31 and the inductor L31). The measurement value indicates a value corresponding to a voltage across the resistance circuit 50. In this embodiment, the resistance circuit 50 is the series circuit of the resistor (first resistor) R52 and the resistor (second resistor) R53.

Further, the output current protection circuit 7 of the present embodiment is constituted by resistors R71 to R74, the capacitor C71, and switching devices Q71 and Q73.

The switching device Q71 has the collector connected to a constant voltage output terminal of the drive circuit 4 via the resistor R73, the base connected to the connection point of the resistors R71 and R72, and the emitter connected to the negative terminal of the capacitor C21.

The switching device Q73 is connected in parallel with the resistor R53, and has a collector connected to one end of the resistor R53 (a connection point of the resistors R52 and R53), an emitter connected to the other end of the resistor R53, and a base connected to a connection point of the resistor R73 and the switching device Q71. In this regard, the switching device Q73 serves as a bypassing switching device connected in parallel with the second resistor R53.

Additionally, the resistor R74 is connected between the base and the emitter of the switching device Q73.

Accordingly, when the magnitude of the voltage across the resistor R61 (the detection value of the load current detector 6) becomes not less than the predetermined abnormality judgment threshold (second threshold), the switching device Q71 is turned on. When the switching device Q71 is turned on, the switching device Q73 is turned off.

The protection device (output current protection circuit) 7 is configured to, when the load current measured by the load current detector 6 is equal to the second threshold or more, perform the protection operation of changing, to reduce the load current, the circuit constant of the power supply path in which the load current flows. The power supply path is, for example, defined as a path including the switching device Q31, the resistance circuit 50, the inductor L31, and the light source 8.

In the present embodiment, the circuit constant of the power supply path is defined as the resistance of the resistance circuit 50. The protection device 7 is configured to, in the protection operation, increase the resistance of the resistance circuit 50. Further in the present embodiment, the protection device 7 includes the bypassing switching device Q73 connected in parallel with the second resistor R53. The protection device 7 is configured to, in the protection operation, increase the resistance of the resistance circuit 50 by turning off the bypassing switching device Q73.

The following explanation is made to the operation of the LED lighting device of the present embodiment. Note that, in the normal state (the LED current Ild is equal to Ild1 (<Ild2)), the switching device Q71 is turned off. In brief, with regard to the normal state, the operation of the present embodiment is same as that of the first embodiment. Therefore, no explanation thereof is deemed necessary.

When the abnormal state that disables the feedback control occurs, like the first embodiment, the turning-off threshold Th is increased up to the upper limit Th2 (>Th1) and thus the LED current Ild is increased. At this time when the LED current Ild is increased and the detection value of the load current detector 6 becomes equal to the abnormality judgment threshold or more, the switching device Q71 is turned on. When the switching device Q71 is turned on, a short circuit between the base of the switching device Q73 and the ground is made and then the switching device Q73 is turned off. As a result, the circuit between the opposite ends of the resistor R53 is opened. Therefore, the current detection resistance (resistance of the resistance circuit 50) of defined by the switching current detector 5 is equal to only the resistance of the resistor R52 in the normal state but is equal to the combined resistance of the resistors R52 and R53 in the abnormal state. In brief, while the switching device Q73 is turned on, the series circuit 50 has the same resistance as that of the first resistor R52. While the switching device Q73 is turned off, the series circuit 50 has the resistance equal to the sum of the resistances of the respective resistors R52 and R53.

Consequently, as shown in FIG. 2 (b), the detection value (the voltage across the series circuit of the resistors R52 and R53) of the switching current detector 5 in the abnormality is greater than the detection value (the voltage across the resistor R52) of the switching current detector 5 in the normal state. This causes an increase in an increasing slope of the detection value of the switching current detector 5. Thus, the turned-on period Tong necessary for the detection value of the switching current detector 5 to reach the turning-off threshold Th2 is shorter than the turned-on period Ton3 of the prior LED lighting device. When the turned-on period Ton is shortened, the LED current Ild becomes Ild3 lower than the abnormal value (Ild4) of the prior art. Therefore, it is possible to keep the LED current Ild lower than the rated upper limit Ild 2 (see FIG. 3).

The LED lighting device of the present embodiment includes the following seventh and eighth features in addition to the aforementioned first and second features. In this regard, the second and eighth features are optional features.

As for the seventh feature, in addition to the first or second feature, the inductor current detector 5 includes the resistance circuit 50 connected in series with the series circuit (the series circuit of the switching device Q31 and the inductor L31). The measurement value indicates the value corresponding to the voltage across the resistance circuit 50. The circuit constant is defined as the resistance of the resistance circuit 50. The protection device 7 is configured to, in the protection operation, increase the resistance of the resistance circuit 50.

As for the eighth feature, in addition to the seventh feature, the resistance circuit 50 is constituted by the series circuit of the first resistor R52 and the second resistor R53. The protection device 7 includes the bypassing switching device Q73 connected in parallel with the second resistor R53. The protection device 7 is configured to, in the protection operation, increase the resistance of the resistance circuit 50 by turning off the bypassing switching device Q73.

As mentioned above, according to the present embodiment, when the abnormality which disables the feedback control occurs, the turned-on period of the switching device Q31 is shortened by means of increasing the detection resistance of the switching current detector 5. Consequently, the supply of the excess current to the light source 8 is suppressed, and the safety can be improved. Further, with suppressing the supply of the excess current to the light source 8, it is possible to reduce thermal stress on the lighting fixture holding the light source 8 and the parts surrounding the light source 8. Hence, resin molded article with a low melting point is available. Thus, it is possible to facilitate a molding process and to reduce a molding cost. Further, even if the abnormality which disables the feedback control occurs, the supply of the LED current Ild is continued and the light source 8 is kept turned on. Hence, the usability can be improved.

Further, the present embodiment changes not the control of turning on and off the switching device Q31 by the drive circuit 4 but the circuit constant. Hence, there is no need to provide a device for sensing the heat of the drive circuit 4. Thus, since the drive circuit 4 need not have a complex configuration, it is possible to use the drive circuit 4 with high versatility. Therefore, the production cost can be reduced.

In the present embodiment, the resistors R52 and the R53 are connected in series with each other and the switching device Q73 is connected in parallel with the resistor R53. However, the present embodiment is not limited to this configuration. For example, resistors may be connected in parallel with each other, and a switching device may be connected in series with one of the resistors. In this example, the switching device connected in series with the resistor is turned off in response to the occurrence of the abnormality. Therefore, also in this example, the detection resistance of the current detector 5 can be reduced.

Fourth Embodiment

Figure 6:
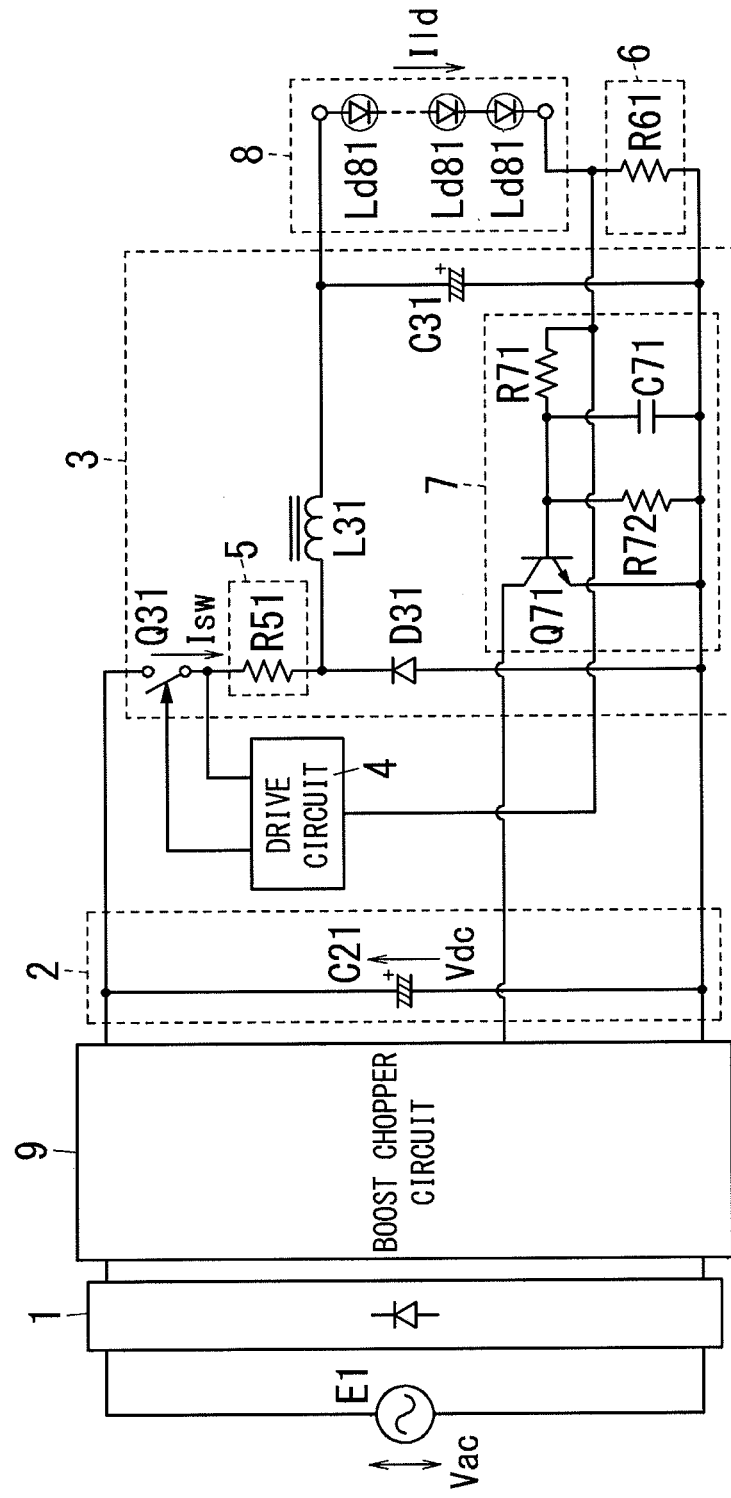
FIG. 6 is a diagram illustrating a circuit configuration of the LED lighting device of the fourth embodiment in accordance with the present invention.

FIG. 6 shows a diagram illustrating the circuit configuration of the LED lighting device of the present embodiment. The LED lighting device of the present embodiment is characterized in that the LED lighting device includes a boost chopper circuit 9 configured to supply power to the step-down chopper circuit 3 and the output current protection circuit 7 increases the output from the boost chopper circuit 9 based on the detection value from the load current detector 6. Note that, components common to the LED lighting devices of the present embodiment and the first embodiment are designated by the same reference numerals and explanations thereof are deemed unnecessary.

The boost chopper circuit 9 is defined by a circuit which is interposed between the power source E1 and the power supply circuit 3 and is configured to generate the input voltage from the voltage supplied from the power source E1. The input voltage is defined as a voltage inputted from the power source E1 to the power supply circuit 3.

The boost chopper circuit 9 is connected to the output side of the rectification circuit 1. The boost chopper circuit 9 generates the DC voltage (input voltage) Vdc which is obtained by boosting the rectified voltage, between the opposite ends of the capacitor C21. Further, the boost chopper circuit 9 includes a series circuit of a plurality of resistors (not shown) which is connected in parallel with the capacitor C21, and obtains a divided voltage value of the DC voltage Vdc generated by the resistors as a detection value indicative of the DC voltage Vdc. The boost chopper circuit 9 controls the DC voltage Vdc such that the obtained detection value of the DC voltage Vdc is equal to a desired value, thereby performing feedback control of the DC voltage Vdc. Note that, detailed configurations and control of the boost chopper circuit 9 are well known, and no explanations thereof are deemed necessary.

Besides, the output current protection circuit 7 of the present embodiment is constituted by the resistors R71 and R72, the capacitor C71, and the switching device Q71. The output current protection circuit 7 is configured such that the collector of the switching device Q71 is connected to the boost chopper circuit 9 and when the switching device Q71 is turned on, the detection value of the DC voltage Vdc obtained by the boost chopper circuit 9 is decreased. For example, resistors for dividing the DC voltage Vdc is provided, and the resistor receiving a lower potential of the resistors is connected in parallel with a series circuit (not shown) of a resistor and a switching device, and this switching device is connected to be turned on when the switching device Q71 is turned on.

When the abnormality occurs and thus the detection value of the load current detector 6 is not less than the abnormality judgment threshold, the switching device Q71 is turned on. In this situation, a voltage dividing ratio of the resistors for detecting the DC voltage Vdc is varied and this causes a decrease in the detection value of the DC voltage Vdc. The boost chopper circuit 9 controls the DC voltage Vdc such that the decreased detection value of the DC voltage Vdc is equal to the desired value. Consequently, the DC voltage Vdc is increased relative to a case where the switching device Q71 is turned off.

The protection device (output current protection circuit) 7 is configured to, when the load current measured by the load current detector 6 is equal to the second threshold or more, perform the protection operation of changing, to reduce the load current, the circuit constant of the power supply path in which the load current flows. The power supply path is, for example, defined as a path including the switching device Q31, the resistor R51, the inductor L31, and the light source 8.

In the present embodiment, the circuit constant of the power supply path is defined as the voltage (inductor voltage) applied across the inductor L31. The protection device 7 is configured to, in the protection operation, increase the current increase rate by increasing the inductor voltage. Further in the present embodiment, the protection device 7 is configured to, in the protection operation, increase the inductor voltage by increasing the input voltage (DC voltage Vdc) inputted into the power supply circuit 3 from the power source E1. For example, the protection device 7 is configured to, in the protection operation, control the circuit (boost chopper circuit) 9 designed to provide the input voltage to the power supply circuit 3, to increase the input voltage.

Accordingly, when the abnormal state that disables the feedback control of the LED current Ild occurs, the DC voltage Vdc inputted into the step-down chopper circuit 3 is increased. An increase in the DC voltage Vdc causes an increase in the increasing slope of the inductor current which flows through the inductor L31 while the switching device Q31 is turned on. As shown in FIG. 2 (b), the time necessary for the detection value of the switching current detector 5 to reach the turning-off threshold Th2 is shortened. When the turned-on period Ton is shortened, the LED current Ild becomes Ild3 lower than the abnormal value (Ild4) of the prior art. Therefore, it is possible to keep the LED current Ild lower than the rated upper limit Ild 2 (see FIG. 3).

As mentioned above, in the LED lighting device of the present embodiment, the output current protection means 7 increases the input voltage to the power supply circuit 3 when the detection result of the load current detector 6 is equal to the second threshold or more.

In summary, the LED lighting device of the present embodiment includes the following ninth to eleventh features in addition to the aforementioned first to third features. Besides, the second, tenth, and eleventh features are optional features.

As for the ninth feature, in addition to the third feature, the circuit constant is defined as the inductor voltage applied across the inductor L31. The protection device 7 is configured to, in the protection operation, increase the current increase rate by increasing the inductor voltage.

As for the tenth feature, in addition to the ninth feature, the protection device 7 is configured to, in the protection operation, increase the inductor voltage by increasing the input voltage (DC voltage Vdc) inputted into the power supply circuit 3 from the power source E1.

As for the eleventh feature, in addition to the tenth feature, the LED lighting device further includes the circuit (boost chopper circuit) 9 which is interposed between the power source E1 and the power supply circuit 3 and is configured to generate the input voltage from a voltage supplied from the power source E1. The protection device 7 is configured to, in the protection operation, control the circuit 9 to increase the input voltage.

In this manner, according to the present embodiment, when the abnormality which disables the feedback control occurs, the turned-on period of the switching device Q31 is shortened by means of increasing the DC voltage Vdc inputted into the step-down chopper circuit 3. Consequently, the supply of the excess current to the light source 8 is suppressed, and the safety can be improved. Further, with suppressing the supply of the excess current to the light source 8, it is possible to reduce thermal stress on the lighting fixture holding the light source 8 and the parts surrounding the light source 8. Hence, resin molded article with a low melting point is available. Thus, it is possible to facilitate a molding process and to reduce a molding cost. Further, even if the abnormality which disables the feedback control occurs, the supply of the LED current Ild is continued and the light source 8 is kept turned on. Hence, the usability can be improved.

Further, in a similar manner as the second embodiment, a latch circuit designed to keep the DC voltage Vdc increased when the abnormality occurs may be provided. In this arrangement, with continuously suppressing the excess current flowing through the light source 8, heat generation at the light source 8 can be suppressed. Consequently, safety can be enhanced.

Fifth Embodiment

Figure 7:
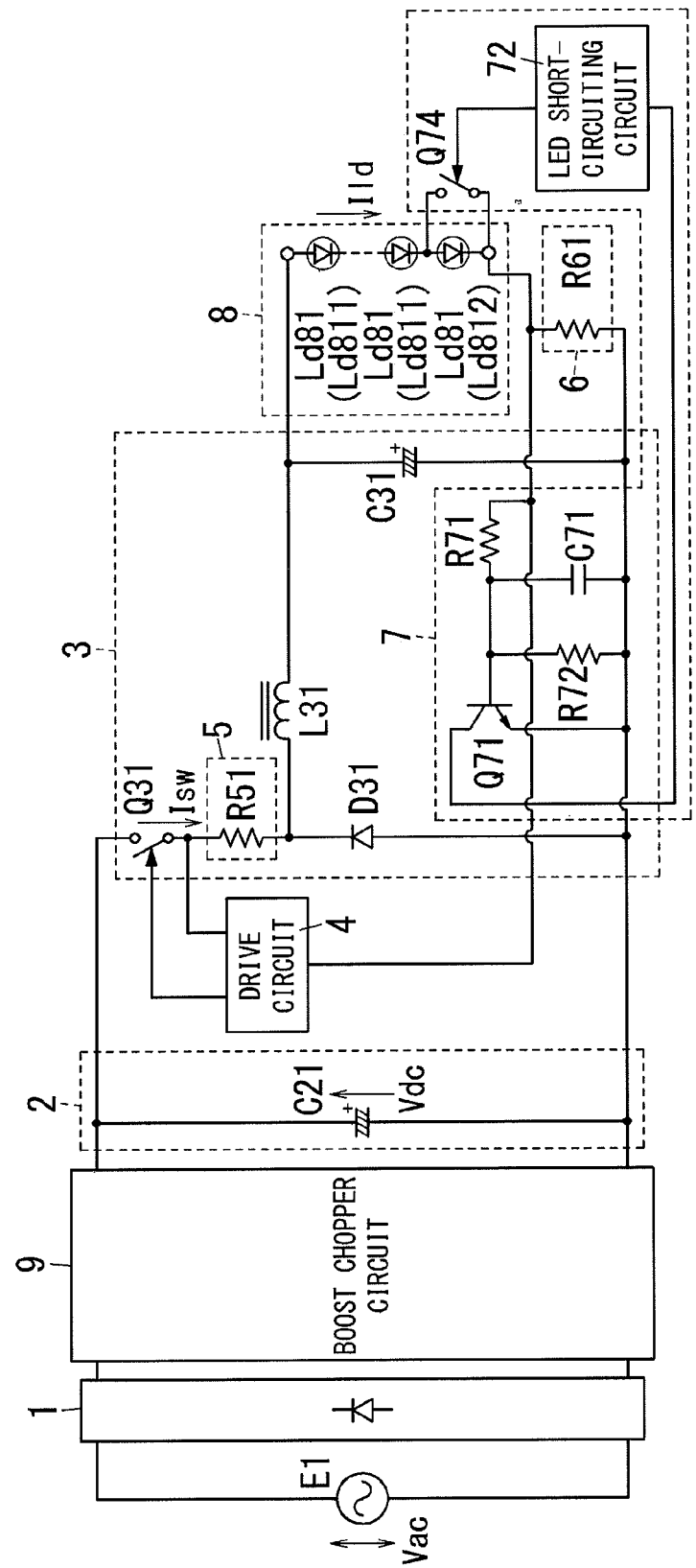
FIG. 7 is a diagram illustrating a circuit configuration of the LED lighting device of the fifth embodiment in accordance with the present invention.
Figure 8:
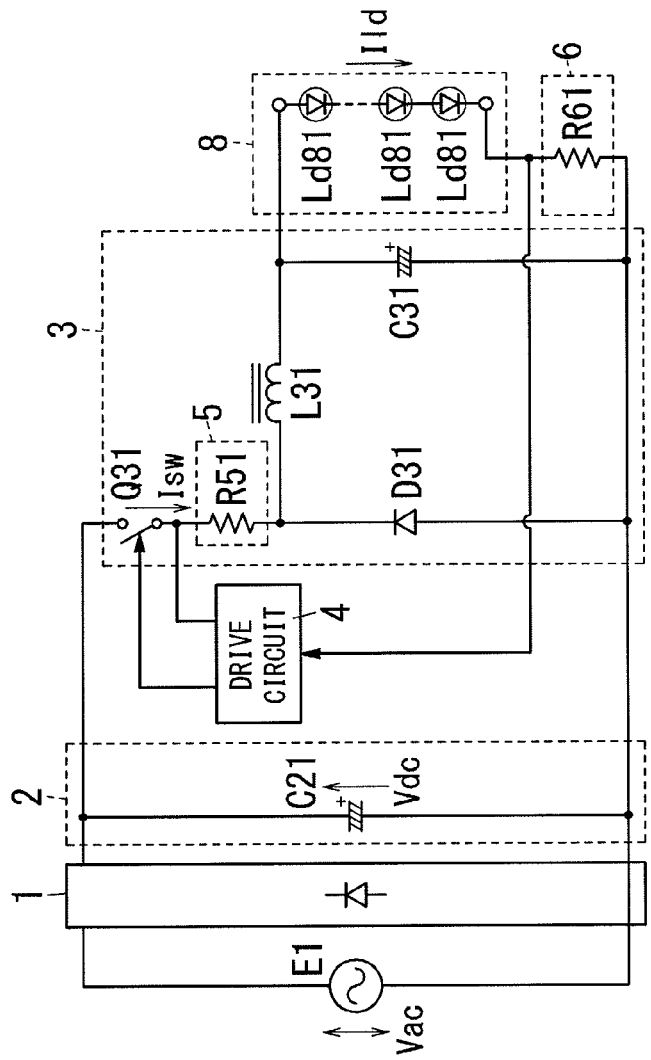
FIG. 8 is a diagram illustrating a circuit configuration of the prior LED lighting device.
Figure 9:
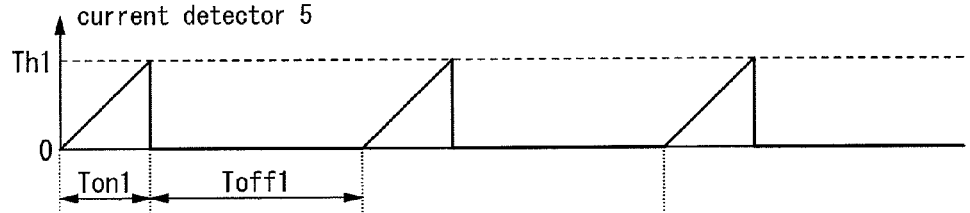
FIG. 9 is a waveform chart illustrating the detection value of the switching current detector of the prior LED lighting device.
Figure 9:
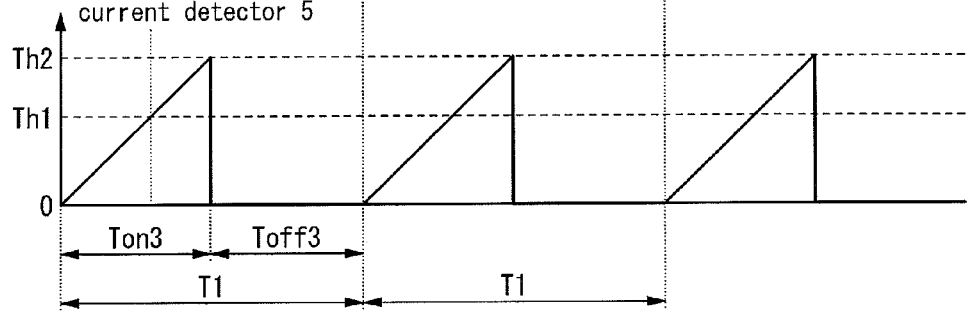
Figure 10:
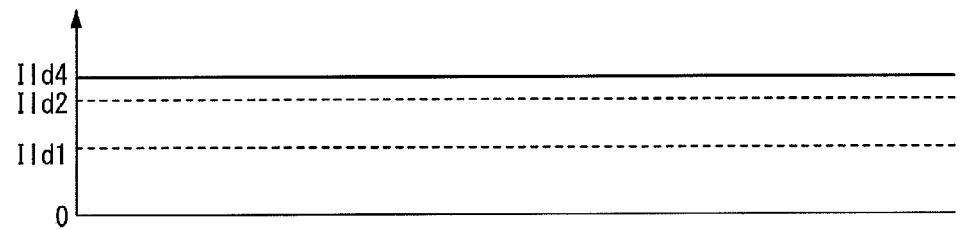
FIG. 10 is a waveform chart illustrating the LED current of the prior LED lighting device.

FIG. 7 shows a diagram illustrating the circuit configuration of the LED lighting device of the present embodiment. The LED lighting device of the present embodiment is characterized by decreasing in response to the occurrence of the abnormality the number of light emitting diodes Ld81 through which the LED current Ild flows. Note that, components common to the LED lighting devices of the present embodiment and the fourth embodiment are designated by the same reference numerals and explanations thereof are deemed unnecessary.

The light source 8 is a series circuit of the first light emitting diode Ld81 (Ld811) and the second light emitting diode Ld81 (Ld812). In the present embodiment, the light source 8 is a series circuit of the two first light emitting diodes Ld811 and the single second light emitting diode Ld812. Note that, the number of first light emitting diodes Ld811 and the number of second light emitting diodes Ld812 are not limited.

The output current protection circuit 7 of the present embodiment is constituted by the resistors R71 and R72, the capacitor C71, the switching devices Q71 and Q74, and an LED short-circuiting circuit 72.

The switching device Q71 has the collector connected to the LED short-circuiting circuit 72. The switching device Q74 is connected in parallel with part (light emitting diode Ld812) of the plurality of light emitting diodes Ld81 connected in series with each other. The switching device Q74 is turned on or off in response to a control signal outputted from the LED short-circuiting circuit 72. In summary, the switching device Q74 serves as a bypassing switching device connected in parallel with the second diode Ld812. Note that, when the plurality of second light emitting diodes Ld812 are connected in series with each other is provided, the switching device Q74 may be connected in parallel with the plurality of second light emitting diodes Ld812.

The LED short-circuiting circuit 72 is configured to turn on the switching device Q74 when the switching device Q71 is turned on, and to turn off the switching device Q74 when the switching device Q71 is turned off.

Accordingly, when the detection value of the load current detector 6 becomes not less than the abnormality judgment threshold, the switching device Q71 is turned on, and the switching device Q74 is also turned on. When the switching device Q74 is turned on, a short circuit between opposite ends of the light emitting diode Ld81 connected in parallel with this switching device Q74 is made. In other words, when the switching device Q74 is turned on, the forward voltage of the light source 8 is decreased by a forward voltage of the second light emitting diode Ld812.

The protection device (output current protection circuit) 7 is configured to, when the load current measured by the load current detector 6 is equal to the second threshold or more, perform the protection operation of changing, to reduce the load current, the circuit constant of the power supply path in which the load current flows. The power supply path is, for example, defined as a path including the switching device Q31, the resistor 51, the inductor L31, and the light source 8.

In the present embodiment, the circuit constant of the power supply path is defined as the voltage (inductor voltage) applied across the inductor L31. The protection device 7 is configured to, in the protection operation, increase the current increase rate by increasing the inductor voltage. Further in the present embodiment, the protection device 7 is configured to, in the protection operation, increase the inductor voltage by decreasing the forward voltage of the light source 8. For example, the protection device 7 is configured to, in the protection operation, decrease the forward voltage of the light source 8 by turning on the bypassing switching device Q74.

Accordingly, when the abnormal state that disables the feedback control of the LED current Ild occurs, the number of series-connected light emitting diodes Ld81 through which the LED current Ild flows is decreased, and thus the voltage (forward voltage) across the light source 8 is decreased.

The increasing slope of the inductor current which flows through the inductor L31 while the switching device Q31 is turned on is expressed as [(the DC voltage Vdc minus the forward voltage of the light source 8)/the inductance of the inductor L31].

Hence, a decrease in the number of series-connected light emitting diodes Ld81 causes an increase in the increasing slope of the inductor current which flows through the inductor L31 while the switching device Q31 is turned on. As shown in FIG. 2 (*b*), the time necessary for the detection value of the switching current detector 5 to reach the turning-off threshold Th2 is shortened. When the turned-on period Ton is shortened, the LED current Ild becomes Ild3 lower than the abnormal value (Ild4) of the prior art. Therefore, it is possible to keep the LED current Ild lower than the rated upper limit Ild 2 (see FIG. 3).

In this LED lighting device, the light source 8 is constituted by the plurality of light emitting elements (light emitting diodes) Ld81. When the detection result of the load current detector 6 is equal to the second threshold or more, the output current protection means 7 decreases the number of series-connected light emitting elements Ld81 to which the load current (LED current Ild) is supplied.

In brief, the LED lighting device of the present embodiment includes the following twelfth and thirteenth features in addition to the aforementioned first to third and ninth features. In this regard, the second, twelfth, and thirteenth features are optional features.

As for the twelfth feature, in addition to the ninth feature, the protection device 7 is configured to, in the protection operation, increase the inductor voltage by decreasing the forward voltage of the light source 8.

As for the thirteenth feature, in addition to the twelfth feature, the light source 8 is constituted by the series circuit of the first light emitting diode Ld81 (Ld811) and the second light emitting diode Ld81 (Ld812). The protection device 7 includes the bypassing switching device Q74 connected in parallel with the second light emitting diode Ld812. The protection device 7 is configured to, in the protection operation, decrease the forward voltage of the light source 8 by turning on the bypassing switching device Q74.

As mentioned above, according to the present embodiment, when the abnormality which disables the feedback control occurs, the turned-on period of the switching device Q31 is shortened by means of decreasing the number of series-connected light emitting diodes Ld81 through which the LED current Ild flows. Consequently, the supply of the excess current to the light source 8 is suppressed, and the safety can be improved. Further, with suppressing the supply of the excess current to the light source 8, it is possible to reduce thermal stress on the lighting fixture holding the light source 8 and the parts surrounding the light source 8. Hence, resin molded article with a low melting point is available. Thus, it is possible to facilitate a molding process and to reduce a molding cost. Further, even if the abnormality which disables the feedback control occurs, the supply of the LED current Ild is continued and the light source 8 is kept turned on. Hence, the usability can be improved.

The invention claimed is:

1. An LED lighting device comprising:
a power supply circuit which is connected between a light source including a light emitting diode and a power source and includes a series circuit of a switching device and an inductor;
an inductor current detector configured to measure an inductor current flowing through the inductor and provide a measurement value indicative of the inductor current;
a drive circuit configured to allow the power supply circuit to provide a predetermined DC current to the light source by turning on the switching device at a predetermined period and turning off the switching device when the measurement value from the inductor current detector is equal to a first threshold or more;
a load current detector configured to measure a load current flowing through the light source; and
a protection device configured to, when the load current measured by the load current detector is equal to a second threshold or more, perform a protection operation of changing, to reduce the load current, a circuit constant of a power supply path in which the load current flows, wherein
the protection device is configured to, in the protection operation, change the circuit constant to shorten a turned-on period of the switching device.

2. An LED lighting device comprising:
a power supply circuit which is connected between a light source including a light emitting diode and a power source and includes a series circuit of a switching device and an inductor;
an inductor current detector configured to measure an inductor current flowing through the inductor and provide a measurement value indicative of the inductor current;
a drive circuit configured to allow the power supply circuit to provide a predetermined DC current to the light source by turning on the switching device at a predetermined period and turning off the switching device when the measurement value from the inductor current detector is equal to a first threshold or more;
a load current detector configured to measure a load current flowing through the light source; and
a protection device configured to, when the load current measured by the load current detector is equal to a second threshold or more, perform a protection operation of changing, to reduce the load current, a circuit constant of a power supply path in which the load current flows, wherein
the protection device is configured to, in the protection operation, increase a current increase rate at the inductor.

3. The LED lighting device as set forth in claim 2, wherein:
the circuit constant is defined as an inductance of the inductor; and
the protection device is configured to, in the protection operation, increase the current increase rate by reducing the inductance of the inductor.

4. The LED lighting device as set forth in claim 3, wherein:
the inductor is constituted by a series circuit of a first winding and a second winding;

the protection device includes a bypassing switching device connected in parallel with the second winding; and
the protection device is configured to, in the protection operation, reduce the inductance of the inductor by turning on the bypassing switching device.

5. The LED lighting device as set forth in claim 4, wherein the protection device includes a latch circuit configured to keep turning on the bypassing switching device.

6. The LED lighting device as set forth in claim 2, wherein:
the circuit constant is defined as an inductor voltage applied across the inductor; and
the protection device is configured to, in the protection operation, increase the current increase rate by increasing the inductor voltage.

7. The LED lighting device as set forth in claim 6, wherein the protection device is configured to, in the protection operation, increase the inductor voltage by increasing an input voltage inputted into the power supply circuit from the power source.

8. The LED lighting device as set forth in claim 7, wherein:
the LED lighting device further comprises a circuit which is interposed between the power source and the power supply circuit and is configured to generate the input voltage from a voltage supplied from the power source; and
the protection device is configured to, in the protection operation, control the circuit to increase the input voltage.

9. The LED lighting device as set forth in claim 6, wherein the protection device is configured to, in the protection operation, increase the inductor voltage by decreasing a forward voltage of the light source.

10. The LED lighting device as set forth in claim 9, wherein:
the light source is constituted by a series circuit of a first light emitting diode and a second light emitting diode;
the protection device includes a bypassing switching device connected in parallel with the second light emitting diode; and
the protection device is configured to, in the protection operation, decrease the forward voltage of the light source by turning on the bypassing switching device.

11. An LED lighting device comprising:
a power supply circuit which is connected between a light source including a light emitting diode and a power source and includes a series circuit of a switching device and an inductor;
an inductor current detector configured to measure an inductor current flowing through the inductor and provide a measurement value indicative of the inductor current;
a drive circuit configured to allow the power supply circuit to provide a predetermined DC current to the light source by turning on the switching device at a predetermined period and turning off the switching device when the measurement value from the inductor current detector is equal to a first threshold or more;
a load current detector configured to measure a load current flowing through the light source; and
a protection device configured to, when the load current measured by the load current detector is equal to a second threshold or more, perform a protection operation of changing, to reduce the load current, a circuit constant of a power supply path in which the load current flows, wherein:

the inductor current detector includes a resistance circuit connected in series with the series circuit;

the measurement value indicates a value corresponding to a voltage across the resistance circuit;

the circuit constant is defined as a resistance of the resistance circuit; and the protection device is configured to, in the protection operation, increase the resistance.

12. The LED lighting device as set forth in claim 11, wherein:

the resistance circuit is constituted by a series circuit of a first resistor and a second resistor;

the protection device includes a bypassing switching device connected in parallel with the second resistor; and the protection device is configured to, in the protection operation, increase the resistance of the resistance circuit by turning off the bypassing switching device.

\* \* \* \* \*